May 22, 1934.  J. L. L. J. PENEY  1,959,497
APPARATUS ADAPTED TO MAINTAIN THE TAIL OF AN ANIMAL AND THE LIKE
Filed Jan. 2, 1932
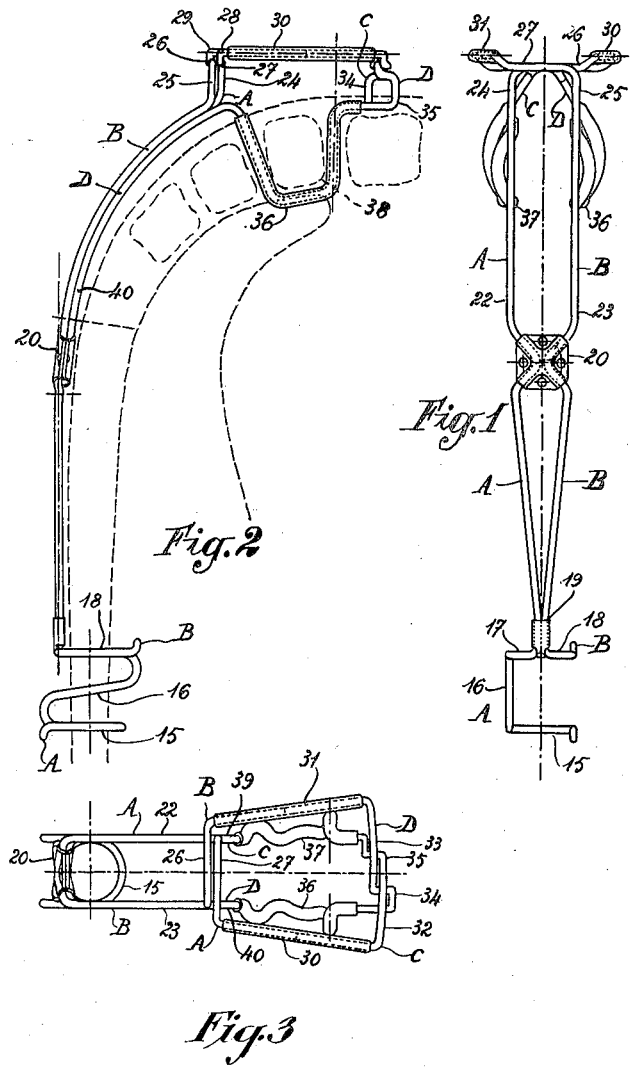
Inventor:
J. L. L. J. Peney
By Emil Bönnelycke
Attorney Patented May 22, 1934

1,959,497

UNITED STATES PATENT OFFICE 1,959,497

APPARATUS ADAPTED TO MAINTAIN THE TAIL OF AN ANIMAL AND THE LIKE

Jean Léonce Louis Joseph Peney, Lyon, France

Application January 2, 1932, Serial No. 584,533
In France January 7, 1931

2 Claims. (Cl. 119—105)

My invention relates to an apparatus adapted to maintain the tail of a cow during the milking operation.

This apparatus is essentially devised so as to press the first caudal vertebra (that nearest the body of the animal) experience having shown that the animal was thus rendered unable to materially move its tail.

In the annexed drawing:

Fig. 1 is a front view of an apparatus according to this invention.

Fig. 2 is a side view of the same.

Fig. 3 is a plan view of the same.

The apparatus illustrated comprises a clamping member for the caudal vertebra of the tail as explained, and also a terminal tail clamp or brace adapted to maintain the end of the tail.

This terminal clamp or brace is formed by a wire, generally referenced as A, bent in the form of a horseshoe, as shown at 15. Wire A also forms an oblique side member 16 and one half of a second horseshoe 17—18, the other half 17 being formed by a second wire, generally referenced as B. The horseshoes 15 and 17—18 are inverted with respect to each other.

Wires A and B are united together by means of a common clamping member 19. They rise therefrom while slightly diverging from each other, up to another common clamping member 20 in which they form a kind of X without crossing each other. From member 20, wires A and B form two parallel, slightly curved portions 22 and 23. They then rise vertically as shown at 24—25 and are turned horizontally at 26—27, so as to cross each other. They then form two slightly diverging horizontal portions 28—29 and terminate within tubular clamps 30 and 31.

Two other wires C and D are also fixed within clamps 30 and 31 as shown. These wires cross each other as shown at 32 and 33. They are then directed downwardly (portions 34 and 35) and they then constitute two jaws 36 and 37 coated with rubber, the shape of which is clearly shown in Fig. 3. These jaws press the first vertebra 38 of the animal tail as shown in dashed lines in the drawing. It may of course press the two first vertebræ.

Wires C and D are then directed downwardly so as to form two curved portions 39 and 40 near portions 22 and 23 of wires A and B and they terminate within clamping member 20.

The clamping pressure of jaws 36 and 37 results from the elasticity of wires A, B, C and D which are preferably made of a high-grade steel. To open the jaws, tubes 30 and 31 are moved toward each other against the elasticity of the wires.

The end of the tail is first passed through the terminal clamp. This is very easily done owing to the horseshoe portions which permit the introduction of the tail laterally. Then jaws 36 and 37 are opened and they are placed on the upper part of the tail as shown in the drawing, so as to clamp the first vertebra of the tail. As aforesaid, the animal is thus rendered unable to dangerously move its tail. The limited swingings of the tail end are prevented by the terminal clamp.

The device as described is simple and of reduced cost. It cannot hurt the animal even when uncleverly operated.

I claim:

1. A device for restricting movement of an animal's tail comprising a pair of rubber coated elastic wire clamping jaws, said jaws being adapted to be resiliently clamped on the first vertebra of the animal's tail, and a terminal brace spaced from but connected to the clamping jaws and consisting of two vertically spaced U-shaped portions mounted one above the other, one leg of one U-shaped portion being connected to one leg of the other U-shaped portion, said U-shaped portions being positioned so that the concave parts thereof face each other, said brace being adapted to hold the pendent portion of the animal's tail.

2. A device for restricting movement of an animal's tail comprising clamping jaws adapted to be resiliently clamped on the first vertebra of the animal's tail, and a terminal brace spaced from but connected to the clamping jaws and consisting of two vertically spaced U-shaped portions mounted one above the other, one leg of one U-shaped portion being connected to one leg of the other U-shaped portion, said U-shaped portions being positioned so that the concave parts thereof face each other, said brace being adapted to hold the pendent portion of the animal's tail, the lower U-shaped portion and one-half of the upper U-shaped portion being formed of a single wire, the other half of said upper U-shaped portion being formed of a second wire, means for retaining the wires together to form the upper U-shaped portion, and a clamp for holding the two wires in their relative positions, said clamping jaws being formed of a pair of wires, one set of ends of the wires forming the clamping jaws being retained by said clamp and the other ends being connected to the free ends of the wires forming the U-shaped portions.

JEAN LÉONCE LOUIS JOSEPH PENEY.